No. 694,682. Patented Mar. 4, 1902.
S. R. SHOUP.
NUMBERING MACHINE.
(Application filed July 24, 1900.)
(No Model.) 5 Sheets—Sheet 1.
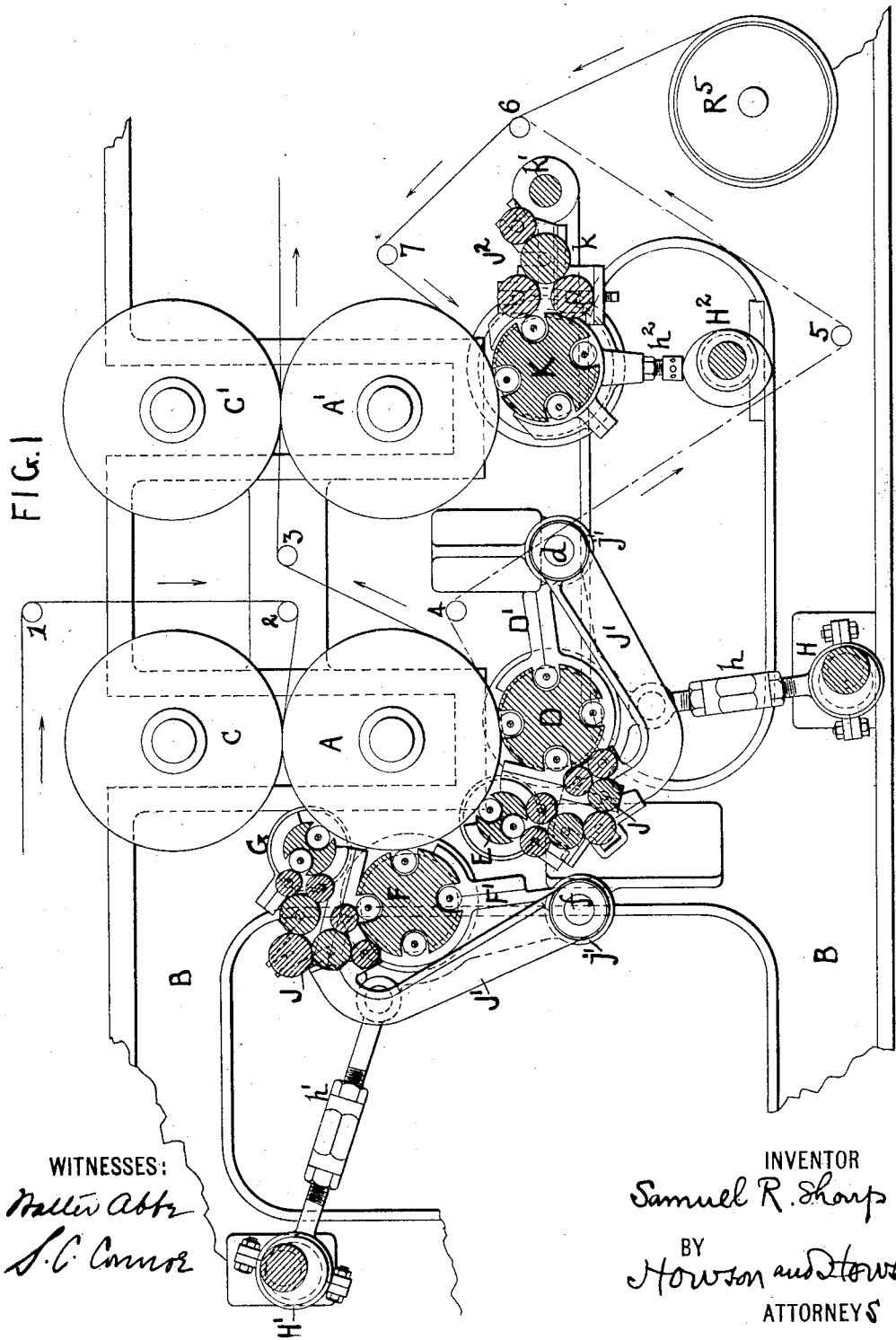
WITNESSES:
INVENTOR
Samuel R. Shoup
BY
Howson and Howson
ATTORNEYS No. 694,682. Patented Mar. 4, 1902.
S. R. SHOUP.
NUMBERING MACHINE.
(Application filed July 24, 1900.)
(No Model.) 5 Sheets—Sheet 2.
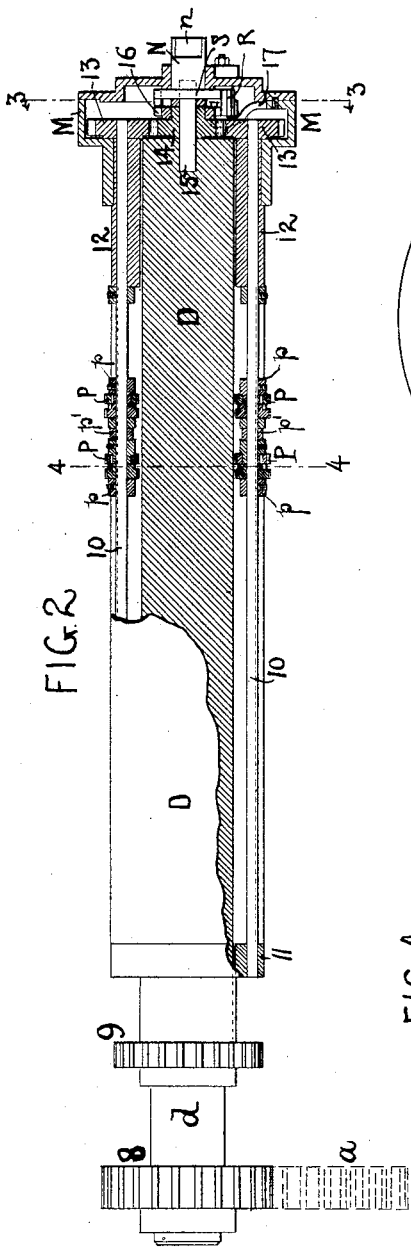
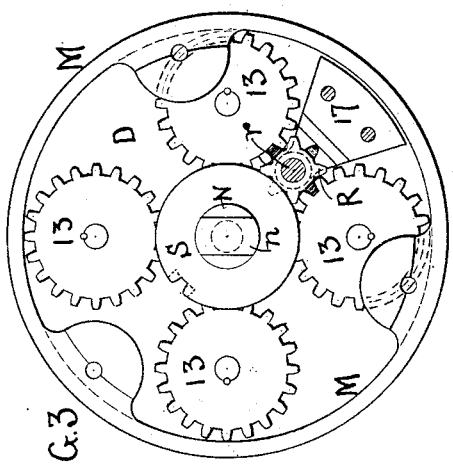
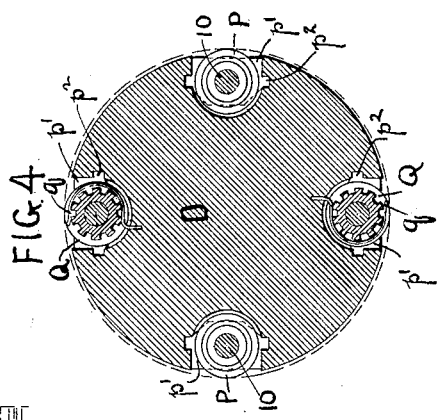
WITNESSES:
Walter Abbr
S. C. Connor
INVENTOR
Samuel R. Shoup
BY
Howson and Howson
ATTORNEYS
THE NORRIS PETERS CO., PHOTO-LITHO., WASHINGTON, D. C.

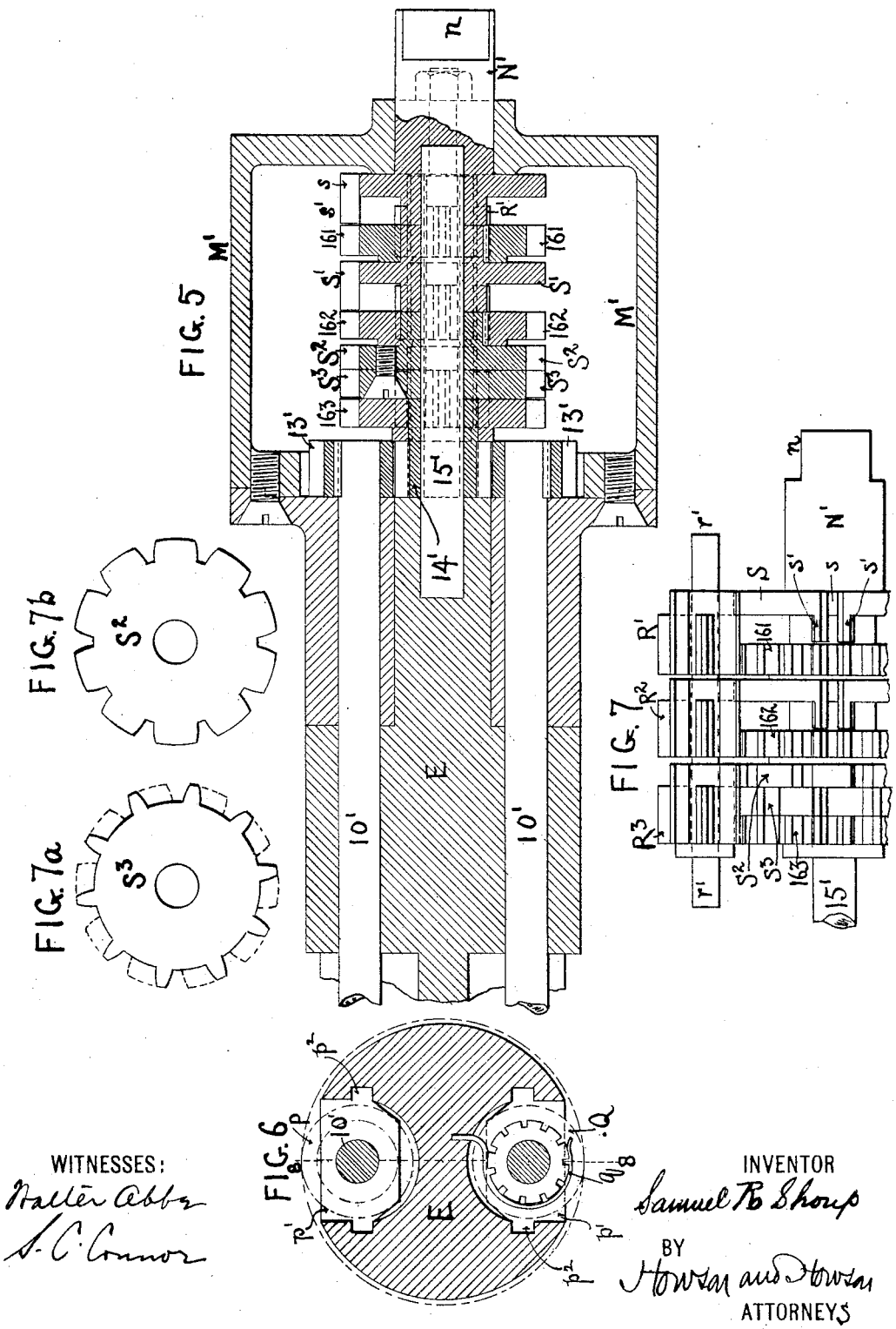

No. 694,682. Patented Mar. 4, 1902.
S. R. SHOUP.
NUMBERING MACHINE.
(Application filed July 24, 1900.)
(No Model.) 5 Sheets—Sheet 4.
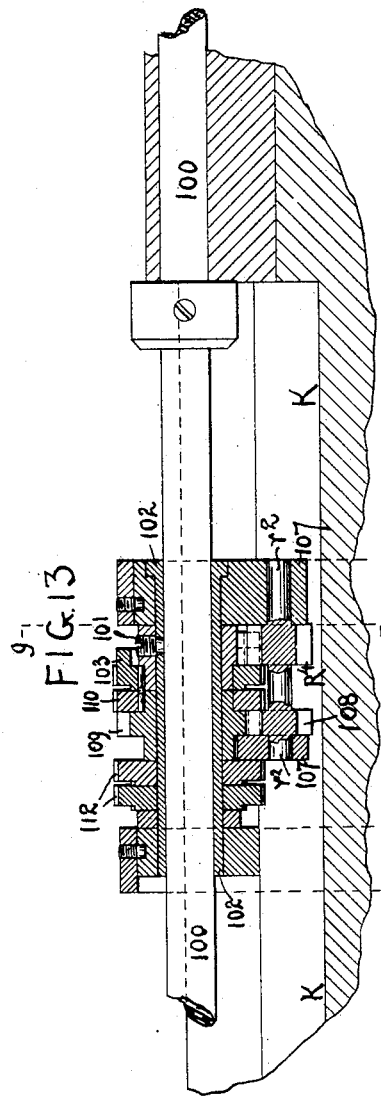
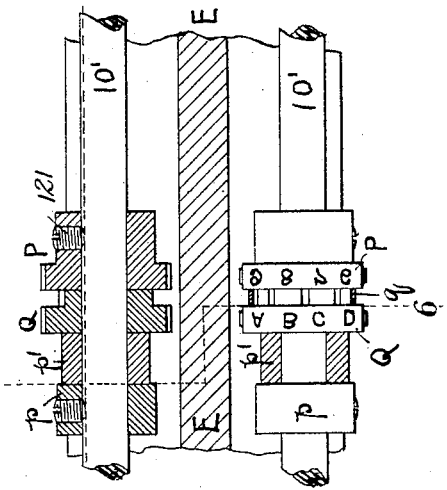
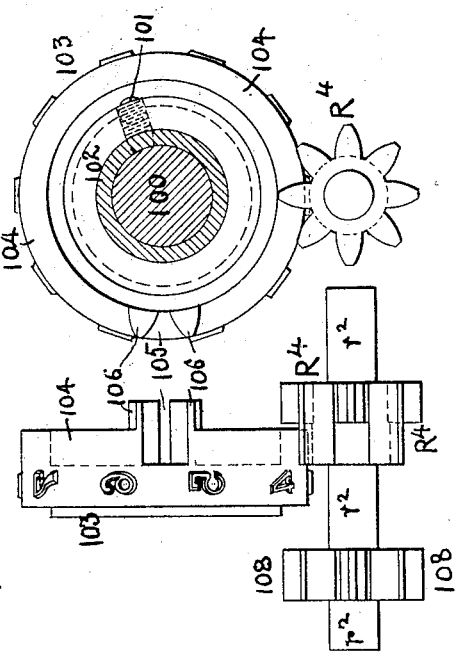
WITNESSES:
INVENTOR
Samuel R. Shoup
BY
Howson and Howson
ATTORNEYS No. 694,682. Patented Mar. 4, 1902.
S. R. SHOUP.
NUMBERING MACHINE.
(Application filed July 24, 1900.)
(No Model.) 5 Sheets—Sheet 5.

WITNESSES:
Walter Abbe
S. C. Connor

INVENTOR
Samuel R. Shoup
BY
Howson and Howson
ATTORNEYS

UNITED STATES PATENT OFFICE.

SAMUEL R. SHOUP, OF WILMINGTON, DELAWARE.

NUMBERING-MACHINE.

SPECIFICATION forming part of Letters Patent No. 694,682, dated March 4, 1902.

Application filed July 24, 1900. Serial No. 24,699. (No model.)

*To all whom it may concern:*

Be it known that I, SAMUEL R. SHOUP, a citizen of the United States of America, residing in Wilmington, in the county of New-castle, State of Delaware, have invented Improvements in Numbering-Machines, of which the following is a specification.

My invention consists of certain improvements in numbering devices for printing and numbering machines, more particularly such as are adapted for the printing and numbering of check-sales slips, tickets, and other such articles.

One of the main objects of my invention is to so construct the numbering devices that no skipping of numbers can possibly take place no matter at what speed the machine may be run; and a further object of my invention is to so construct the numbering devices as to facilitate the speed of production of numbered check-sales slips, tickets, &c.

Figure 9:
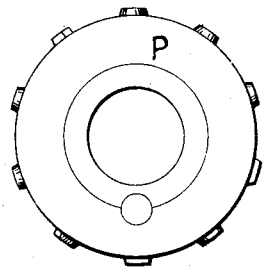
Figure 9A:
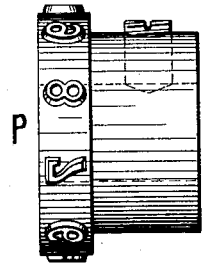
Figure 11:
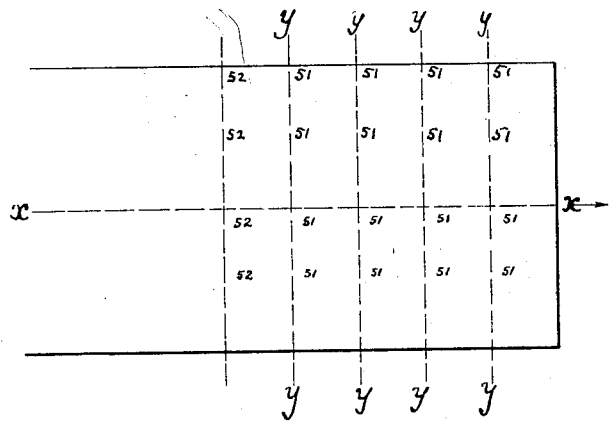
Figure 12:
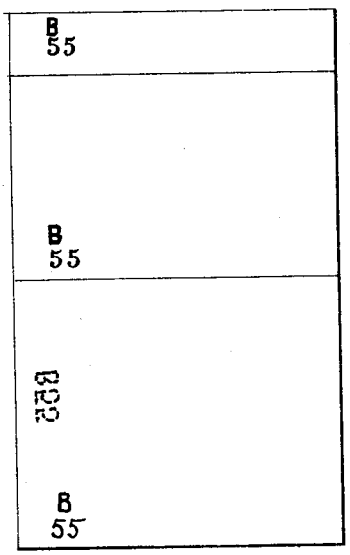
Figure 10:
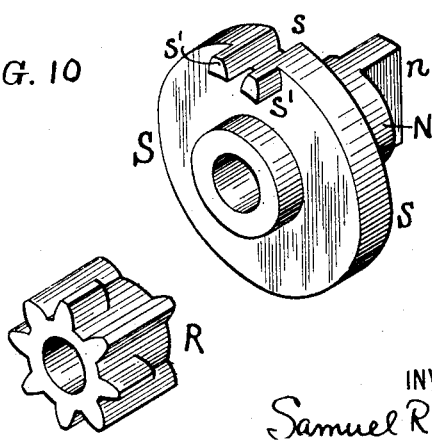

In the accompanying drawings, Figure 1 is an elevation, partly in section, of a printing-press provided with my improvements. Fig. 2 is an enlarged view, partly in section, of one of the numbering-cylinders, (the units cylinder or head.) Fig. 3 is a sectional view on the line 3 3, Fig. 2, but drawn to a larger scale. Fig. 4 is a sectional view on the line 4 4, Fig. 2. Fig. 5 is an enlarged sectional view at one end of the tens numbering head or cylinder. Fig. 6 is a transverse section through the tens numbering-cylinder on the line 6 6, Fig. 8, at a point corresponding with that on which Fig. 4 is taken. Fig. 7 is a detached plan view of the gearing in the "controller" of the tens numbering-head. Figs. 7ª and 7ᵇ are detached views of two of the gear-wheels. Fig. 8 is a sectional view on the line 8 8, Fig. 6. Figs. 9 and 9ª are views, on an enlarged scale, of one of the numbering-wheels. Fig. 10 is a perspective view illustrating more fully the construction of the intermediate feed and locking gear. Fig. 11 is a view illustrating the mode of printing and numbering which I prefer to employ; and Fig. 12 is a view, drawn to a larger scale, of a numbered check-sales slip. Fig. 13 is a longitudinal section through a part of another form of numbering-head. Fig. 14 is a transverse section on the line 9 9, Fig. 13; and Fig. 15 is a side view of a feed-wheel.

In these drawings I have illustrated my invention as adapted to carry out the expeditious and economical mode of making check-sales slips which is shown and described as adapted to the manufacture of duplex check-sales slips in Patent No. 600,094, dated March 1, 1898. The characteristic feature of this method is the feeding of the web or webs of paper through the printing and numbering machine in such a way that the web or webs may be slit lengthwise, printing and numbering two or more slips or tickets at a time and then cutting off the printed slips or tickets, the length of these slips or tickets lying across the web. This will be understood better on reference to Figs. 11 and 12, the latter illustrating a check-sales slip divided into three sections or coupons, all of which are numbered alike. In Fig. 11 the web of paper traveling in the direction of the arrow has check slips or tickets printed in pairs end to end, the web or webs being slit lengthwise at $x$ $x$ and the pairs of slips being cut off on the lines $y$ $y$.

Now one of the problems to be solved was how to print and number slips or tickets on a high-speed rotary printing-press so that the slips shall be printed, cut off, and delivered sidewise, as indicated in Fig. 11, with the numbers running in the direction shown in the upper two sections of Fig. 12—that is, in the direction of the line of feed of the web through the press. It is impracticable to arrange the numbering-wheels about a cylinder with their axes at right angles to the axis of the cylinder. To meet this difficulty, I provide separate and independent numbering-heads for the units, tens, hundreds, and I group these numbering-heads about the rotary impression-cylinder, so that as the paper is fed through the press the units, tens, hundreds, &c., of any given number will be printed in succession, or one after the other, but so as to produce complete numbers with the figures of those numbers in proper order, as illustrated in the two upper sections of Fig. 12.

Referring to Fig. 1, A is a rotary impression-cylinder mounted in suitable bearings in the frame B of the press, and over this is a printing-cylinder C. Grouped around the impression-cylinder A, I have shown four numbering-heads D, E, F, and G, the two numbering-heads D E being mounted to turn in suitable bearings in a frame D', pivoted at $d$ to the frame of the machine, so that the two cylinders D E can be moved up toward or away from the impression-cylinder by means of an eccentric H through an adjustable connecting-rod $h$. The numbering-heads F and G are carried in bearings in a suitable swinging frame F', pivoted at $f$ to the frame, so that the said numbering-heads may be moved up toward or away from the cylinder A by an eccentric H' through an adjustable connecting-rod $h'$. Any suitable inking device may be provided. I have shown for the pair of numbering-heads D E and likewise for the pair of numbering-heads F G sets of inking-rollers J, mounted in bearings in arms J', suitably carried by the frame. In the present instance I have shown one of the arms J' as mounted on the pivot $d$, while the other is mounted on the pivot $f$. Any suitable means—such as springs $j'$, coiled around the pivots—may be provided to act on the arms J' to keep the inking-rollers up to their work.

The web of paper to be printed, numbered, and cut into slips or tickets enters the machine as indicated by the arrows, passing first over guide-rollers 1 and 2 and then between the impression-cylinder A and the printing-cylinder C and then around the cylinder A, where they receive the successive numbering impressions. If the numbers on the slips or tickets are all to run in the direction shown in full lines in Fig. 12, the web may then be passed over the guide-roller 3 and out between the cylinders A' and C'. If, however, there is to be another number put on the back of each slip, the figures of such number may lie in a direction at right angles to the first, as indicated by dotted lines at the bottom section of Fig. 12. In such case the web on leaving the cylinder A is passed around a guide-roller 4, thence to a guide-roller 5 and rollers 6 7, and between the impression-cylinder A' and a fifth numbering-head K. The paper then passes half-way around the impression-cylinder A' and out between that and the printing-cylinder C'. If the paper is to be printed only with numbers lying at right angles to the line of feed, the roll of paper is mounted in the pit of the press, as at $R^5$, Fig. 1, and the web after passing over guide-rollers 6 7 passes between the numbering-head K and the cylinder A' and out between the latter and the printing-cylinder C'. The numbering-head K is mounted in a suitable bearing in an arm $k$, pivoted at $k'$ to the frame and adjustable toward and from the impression-cylinder A' by means of a cam or eccentric $H^2$ acting on an adjustable stud $h^2$ on the arm $k$. A suitable set of inking-rollers $J^2$ is provided for the numbering-head K.

Of the several numbering-heads grouped about the cylinder A that marked D is for printing the units, that marked E is for printing the tens, that marked F is for printing the hundreds, and that marked G is for printing the thousands. In the present instance I have shown the head D as provided with four spindles, each carrying one or more numbering disks or wheels, while the tens-head E is shown as provided with two numbering-spindles. The hundreds-head F is shown as provided with four numbering-spindles, and the thousands-head G is provided with two numbering-spindles. These several numbering-spindles lie parallel with the axis of the cylinder A. The construction of these numbering heads and spindles will be more readily understood on reference to Figs. 2, 3, and 4, which illustrate the units numbering-cylinder D. The numbering-head is in the form of a cylinder provided at one end with a journal $d$, turning in a bearing in the arm D', while at the other end it is provided with a box M, secured to the cylinder D and adapted to turn on a stud N, Fig. 2, which has a slabbed outer end $n$, Figs. 2, 3, and 8, to be supported and held in a notch or recess in the side frame of the machine, so that the stud N cannot rotate. Each of the numbering-head cylinders D, E, F, and G receives continuous rotary motion from a gear (indicated at $a$, Fig. 2) on the end of the cylinder A, gearing into a pinion 8, Fig. 2, on the numbering-head, so that the printing-faces of the type-wheels or numbering-disks P of each numbering-head will travel at the same surface speed as the impression-cylinder A. A pinion 9, Fig. 2, on the numbering-head shaft may be employed to transmit motion to the adjacent inking-rollers through the usual gearing.

The spindles 10, which carry the numbering-wheels P, Figs. 2, 9, and $9^a$, turn in bearings 11 12, carried by the cylinder D, and each spindle has secured to its end within the box M a pinion 13, gearing into a central pinion 14, turning on a pin 15, secured in the end of the cylinder and extending into the stud N. Secured to the pinion 14 is a pinion 16, which gears into all the teeth of a pinion R, provided with alternate long and short teeth, as illustrated more fully in Fig. 10. This pinion R turns on or with a spindle $r$, carried by the box M and a bracket 17, Figs. 2 and 3. A feed and locking disk S, which forms part of or is secured to the stud N, engages with the long teeth of the pinion R, as will be understood on reference to Figs. 3 and 10, and at a certain point in its periphery this disk has a notch $s$ and a pair of laterally-projecting teeth $s'$. The smooth edge of the disk S engages in the spaces between the long teeth of the pinion R; but when in the revolution of the controller-box M the pinion R reaches the notch $s$ in traveling around the disk S the small tooth of the pinion which happens to be in position will come into contact with the advance one of the teeth $s'$ $s'$ and cause the pinion R to turn upon its own axis, the next long tooth turning into the notch $s$ and completing the partial turning movement of the pinion R, so as to bring the smooth edge of the disk S into the succeeding space between the next two long teeth, in which position the pinion R is then locked until another revolution of the cylindrical head D is completed. The intermittent rotary movement thus imparted to the pinion R is transmitted through the pinions 16, 14, and 13 to the spindles 10 and their numbering-wheels P, so that each units numbering wheel or disk is turned from one number to the next once at each revolution of the cylinder or head D. Meantime it is held positively locked against rotation. The construction described not only does away with feed pawls and ratchets, but eliminates all chance of unintentional skipping or repeating of the numbers, no matter at how high a speed the machine may be run, for the intermittent feed motion is positively controlled, and between each intermittent feed the numbering-disks are controlled and held positively locked by the plane edge of the disk S lying between the long teeth of the pinion R, as shown in Fig. 3. I therefore term the described gearing in the box at the end of the numbering-head the "controller" or "controlling device," operatively interposed between the continuously-revolving head and the spindles carrying the numbering disks or wheels.

As will be seen on reference to Figs. 9 and 9ª, each of the numbering-disks or typewheels P of the heads D, E, F, and G has its numbers arranged about its periphery with their vertical axes parallel with the axis of the disk—a position at right angles to that occupied by the numbers of ordinary numbering-wheels. These wheels P may be adjusted to different positions lengthwise of their respective spindles and secured by means of set-screws 121, Fig. 8. In addition there may be provided on the spindles of one of the heads additional wheels Q, Fig. 8, carrying designating letters or numbers for the departments or salesmen. This wheel Q is loose on its spindle, but normally held from turning by a suitable spring-catch, such as $q$, Fig. 6. To change the department or salesman's number or letter, such as "B," Fig. 12, the press must be stopped and the spring-catch $q$ released by hand.

Adjustable collars $p$ retain the numbering-wheels lengthwise on the spindles. If desired, bearing-blocks $p'$ may be provided with projections to slide lengthwise in grooves $p^2$ in the cylindrical numbering-head, Figs. 4 and 6, to support the spindles at the points where the numbering-wheels are fixed thereon.

The four sets of numbering-disks or typewheels P on the head D will all be set to start at the same number and will all receive their intermediate feed simultaneously. The distance circumferentially around the cylindrical head from one numbering-disk to the succeeding disk on the next spindle is equal to the width of the check-slip to be printed, so that the slips are printed and numbered in sets of four, all the slips of a set being thus numbered alike, Fig. 11. The web is in the first instance cut across at $y$ only at every fourth slip, so as to deliver sheets of four slips each, one on top of the other, and afterward the sheets thus collated are cut up together in a cutting-machine and are bound into books.

From the description already given of the controller for the units numbering-disks it will be readily understood how through the medium of similar but slightly-varied gearing the numbering-disks of the tens, hundreds, and thousands numbering-heads may be controlled to give positive intermittent feed at the proper times, with intermediate positive locking of the numbering-disks from the continuously-rotated numbering-cylinder itself.

In the case of the tens numbering-head and the thousands numbering-head provision will have to be made in the gearing whereby it will act only at every second revolution of the numbering-head, since the tens-head and the thousands-head are for economy in room made each but one-half the diameter of the units-head or the hundreds-head, and accordingly I provide two numbering-spindles instead of four. To show how this may be accomplished, I will now describe the construction and operation of the controller for the tens numbering-cylinder, referring particularly to Figs. 5, 7, and 7ª. To the end of the numbering-head cylinder E is secured a controller-box M', similar to the box M on the units-cylinder D, although made larger to contain the necessarily-increased number of gear-wheels. The end of the box turns, as before, on a stud N', slabbed at $n$, so that it can be held in a clamp on the inside of the frame of the press. On this stud, within the box M', is a feed and locking disk S, the same as shown in Fig. 10 and described with reference to the units numbering-cylinder. This disk S is provided with a notch $s$ in its otherwise smooth periphery and laterally-projecting teeth $s'$ adjacent to the notch to work in conjunction with the long and short teeth of a pinion R', similar to that shown in Fig. 10. This pinion R' turns on a spindle $r'$, Fig. 7, in the box. With the long and short teeth of this pinion R' also gears a toothed wheel 161, Figs. 5 and 7, which is keyed to the hub of a second feed and locking disk S', similar to the disk S. The disk S', with its notch and pair of laterally-projecting teeth, works in conjuction with a second pinion R² on the spindle $r'$, like the pinion R'. A toothed wheel 162 gears with the short and long teeth of this pinion R², and this wheel 162 is keyed to the hub of a duplex wheel, consisting of two toothed wheels S² and S³, secured together. The wheel S² has ten notches, with intermediate wide teeth, as though the wheel had been made originally an ordinary gear-wheel with twenty teeth and every other space filled in. On the other hand, the wheel S³ is made with ten gear-teeth of ordinary size, but with intermediate wide notches, as though the wheel had been made originally with twenty teeth and every other tooth cut out. (See Figs. 7ª and 7ᵇ.) The two wheels thus made are secured together, as indicated by the dotted lines in Fig. 7ª. The wide teeth of the wheel S² work in conjunction with the long teeth of a pinion R³ (similar to the pinions R' R²) on the spindle r', while the spaced teeth of the wheel S³, Fig. 7, work in conjunction with both the long and short teeth of the pinion R³. With the long and short teeth of this same pinion R³ mesh the teeth of a gear-wheel 163, which turns on the pin 15' and is keyed to the hub of a central pinion 14', gearing in turn into the opposite pinions 13' on the spindle 10', which carry the type-wheels or numbering-disks. The operation of this gearing is as follows: At each revolution of the numbering-head cylinder E, with its controller-box M', the stud N' and its feed and locking disk S being stationary, the pinion R' will receive a partial turn on its own axis when it reaches the notch in the disk S and will transmit a corresponding movement to the gear-wheel 161, and at the same time the second feed and locking disk S', being keyed to the gear-wheel 161, will be moved one-tenth of a revolution. At the end of every ten revolutions of the head E and box M' the disk S' will through the pinion R² impart to the pinion 162 a tenth of a revolution. If this wheel 162 had a hub geared directly to the pinions 13', the spindles 10', and consequently the type-wheels or numbering-disks thereon, would be turned a corresponding tenth of a revolution each from one tens-number to the next at each revolution of the numbering-head; but since this numbering-head is provided with only two numbering-spindles, whereas the units numbering-head is provided with four, I provide between the gear 162 and the pinions 13' means for turning those pinions 13' and the spindles 10' only at every second revolution of the numbering-head. This is accomplished by means of the units-wheels S² S³. At one movement of the wheel 162 a notch of the wheel S² (turning with the wheel 162) will engage one of the long teeth of the pinion R³, turning the latter correspondingly and transmitting the desired motion to the numbering-spindles 10' through the wheel 163, pinion 14', and pinions 13'. At the next movement of the wheel S² the pinion R³ will not only fail to turn, but will be locked by the periphery of the broad teeth, Fig. 7ᵇ, of the wheel S² riding between a pair of the long teeth of the pinion R³. At the next succeeding movement of the wheel S² the next succeeding notch of that wheel will engage with the next succeeding long tooth of the pinion R³, and then with the aid of the adjacent spaced tooth of the wheel S³ a feed movement will be transmitted through the pinion R³ to the wheel 163, pinion 14', pinions 13', and numbering-spindles 10'. In other words, the tens type-wheels or numbering-disks will change their numbers at every twentieth revolution of the head E, as will now be understood.

It will be understood how in the operation of the printing and numbering press described the figures of any given number are printed by the heads D, E, F, and G one figure at a time. Thus in printing the number "6345" the web in passing through the press as arranged in Fig. 1 will receive the impression of the figure "6" from the thousands-head G. Then it will receive the impression of the figure "3" from the hundreds-head F, then the impression of the figure "4" from the tens-head E, and finally the impression of the "5" from the units-head D. Care is taken with the register, so that the successive impressions will produce the desired number, with its figures properly spaced and in alinement. In addition to facilitating the manufacture of check-sales slips, &c., in quantity this mode of numbering enables me to print the different figures of a number in different-colored inks, and thus to diminish liability to counterfeiting of tickets, &c.

In the case of the numbering-head K, which is shown as provided with four numbering-spindles, the type-wheels or numbering-disks have their numbers lying in the usual direction, Fig. 15—that is, at right angles to that shown in Fig. 9ª—and the units, tens, and other numbering-wheels on this numbering-head K can therefore be arranged side by side, so as to print all the figures of a number at one operation, contrary to the arrangement described with reference to the numbering-heads D, E, F, and G. The numbering-head K is, however, provided with a controller-box the same as that employed for the units numbering-head, Figs. 2 and 3. In Fig. 13, therefore, which illustrates the construction and arrangement of the numbering-disks on the numbering-head K, I have not thought it necessary to repeat the construction of controller-box illustrated in Figs. 2 and 3, it being understood that in Fig. 13 the spindle 100 takes the place of and is operated in the same way as the spindle 10, Fig. 2—that is, once for every revolution of the head—by means of the intermittent feed and locking devices already described in connection with Figs. 2 and 3. On the spindle 100 is secured by a set-screw 101 or other means a sleeve 102 and the hub of the units numbering-wheel 103. As seen in Figs. 14 and 15, this numbering-wheel 103 has a lateral flange or ring 104 with a smooth periphery, except where a notch 105 occurs, and adjacent to this notch are two laterally-projecting teeth 106. These features constitute the equivalent of the intermittent feed and locking disk S, already described with reference to Fig. 10 and other preceding figures. The locking and feed flange described works in conjunction with a pinion R⁴, similar to that shown in Fig. 10, but mounted on a spindle r², which turns in brackets 107, carried by the numbering-head cylinder K. This spindle r² also carries a pinion 108, gearing into a toothed wheel 109, free to turn upon the sleeve 102 and having keyed to it the tens numbering-wheel 110. The units numbering-wheel 103 will turn one number at each revolution of the numbering-head, whereas the tens numbering-wheel 110 will be turned one number at the completion of each revolution of the units-wheel 103, as will be readily understood. For simplicity's sake I have here described only units and tens numbering-wheels; but hundreds-wheels or thousands-wheels may be added, if desired, and operated in a similar way. Type-wheels 112 may be added, free upon the sleeve 102, but adapted to be locked in position by spring or other catches, as in the case of the wheels Q, Fig. 6. These wheels 112 carry letters or figures to designate department or sales numbers and are to be changed by hand whenever necessary.

In threading the web of paper through the press from the first numbering-head to the numbering-head K—that is, over the guide-rollers 4, 5, 6, and 7—the numbering-head K will number the slips on the back, as indicated, for instance, by dotted lines in Fig. 12; but it will be readily understood that the paper may be fed through the machine so that the numbering done by the head K will be on the front of the sheet.

I claim as my invention—

1. A numbering-head adapted to be rotated and having a rotary numbering-spindle with a fixed stud carrying a feed and locking disk, a coöperating pinion with long and short teeth carried by the head and gearing also carried by the head to transmit rotary motion from the said pinion to the numbering-spindle.

2. A numbering-head having a rotatable spindle, a numbering-wheel fixed to the spindle and a numbering-wheel free to turn on the spindle with a hand-controlled catch device to lock the free wheel in its adjusted position to the numbering-head.

3. The combination of a rotary printing-press with a series of rotary numbering-heads, one for the units, another for the tens, another for hundreds, &c., each numbering-head having numbering-wheels, controller means for intermittently and automatically rotating the numbering-wheels in each of said heads, and means whereby the units, tens, hundreds, &c., of any given number are printed by said heads at different times.

4. The combination of the impression-cylinder of a rotary printing-press with a series of rotary numbering-heads grouped in succession around said impression-cylinder, one of the said heads being for units, another for tens, another for hundreds, &c., and each head having rotary numbering-wheels, controller means for intermittently and automatically rotating the numbering-wheels in each head and means whereby the units, tens, hundreds, &c., of any given number are printed by said heads at different times.

5. The combination of a rotary printing-press with a series of rotary numbering-heads, one for the units, another for the tens, another for the hundreds, &c., each numbering-head having rotary numbering-wheels on each of which the numbers have their vertical axes parallel with the axis of the wheel, controller means for intermittently and automatically rotating the numbering-wheels in each of said heads and means whereby the units, tens, hundreds, &c., of any given number are printed by said heads at different times.

6. The combination of a rotary printing-press with a series of separate rotary numbering-heads, one for the units, another for the tens, another for the hundreds, &c., rotary numbering-wheels in each head, and each such wheel having its numbers with their vertical axes parallel with the axis of the wheel, and means whereby the units, tens, hundreds, &c., of any given number are printed by said heads at different times, all substantially as described.

7. A rotating numbering-head provided with a rotary numbering-spindle in combination with a fixed feed and locking disk, a coöperating pinion having long and short teeth carried by the head and gearing also carried by the head to transmit rotary motion from said pinion to the numbering-spindle.

8. A rotary numbering-head provided with a rotary numbering-spindle, in combination with a controller consisting of a notched feed and locking disk having laterally-projecting teeth, a pinion having long and short teeth, to coöperate with the notch and teeth of the locking-disk, and gearing to transmit motion from said pinion to the numbering-spindle.

9. In a printing-press, a rotary numbering-head provided with two or more rotary numbering-spindles geared together to rotate on their several axes simultaneously, in combination with a single controlling device for the several spindles, said controlling device comprising intermittent feed and locking gear to convert the rotary motion of the head into intermittent rotary motion of the numbering-spindles with intermediate locking of the latter.

In testimony whereof I have signed my name to this specification in the presence of two subscribing witnesses.

SAMUEL R. SHOUP.

Witnesses:
 HUBERT HOWSON,
 JOS. H. KLEIN.